US012547660B1

(12) United States Patent
Taccari et al.

(10) Patent No.: US 12,547,660 B1
(45) Date of Patent: Feb. 10, 2026

(54) SYSTEMS AND METHODS FOR RETRIEVING RELEVANT VIDEO FOOTAGE BASED ON A NATURAL LANGUAGE QUERY

(71) Applicant: Verizon Patent and Licensing Inc., Basking Ridge, NJ (US)

(72) Inventors: Leonardo Taccari, Florence (IT); Yari Marchetti, Poggibonsi (IT); Andrea Benericetti, Prato (IT); Matteo Simoncini, Pistoia (IT); Alessio Sanfratello, Lamporecchio (IT); Tommaso Innocenti, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/999,484

(22) Filed: Dec. 23, 2024

(51) Int. Cl.
*G06F 16/735* (2019.01)
*G06F 16/787* (2019.01)

(52) U.S. Cl.
CPC .......... *G06F 16/735* (2019.01); *G06F 16/787* (2019.01)

(58) Field of Classification Search
CPC .............................. G06F 16/735; G06F 16/787
See application file for complete search history.

(56) References Cited

U.S. PATENT DOCUMENTS

| | | | |
|---|---|---|---|
| 10,922,350 B2 * | 2/2021 | Zhao ........................ | G06F 16/41 |
| 11,636,291 B1 * | 4/2023 | Zuo ................... | G06F 18/24147 |
| | | | 382/159 |
| 12,026,936 B1 * | 7/2024 | Choi ....................... | G06V 20/46 |
| 2015/0186419 A1 * | 7/2015 | Agrawal ................ | G06Q 30/02 |
| | | | 707/722 |
| 2015/0339380 A1 * | 11/2015 | Zhang ............... | G06F 16/24578 |
| | | | 707/769 |
| 2018/0096071 A1 * | 4/2018 | Green ................... | G06F 16/248 |
| 2023/0048742 A1 * | 2/2023 | Mishra .................. | G06F 40/284 |
| 2024/0220530 A1 * | 7/2024 | Wilkins ................ | G06F 16/433 |
| 2025/0077576 A1 * | 3/2025 | Jain ........................ | G06V 20/41 |

OTHER PUBLICATIONS

Nguyen et al., "Multiple Visual-Semantic Embedding for Video Retrieval from Query Sentence", Apr. 16, 2020, pp. 1-8 (Year: 2020).*

* cited by examiner

*Primary Examiner* — Jared M Bibbee

(57) ABSTRACT

A device may receive video data and description data, and may extract image embeddings and video embeddings from the video data. The device may receive a query that includes a natural language description of a scene to be retrieved from the video data. The device may split the query into a first subquery and a second subquery, and may process the first and second subqueries, with a model, to generate a first query embedding and a second query embedding. The device may generate appearance similarity measures based on the image embeddings and the first query embedding, and may generate dynamic similarity measures based on the video embeddings and the second query embedding. The device may combine the appearance similarity measures and the dynamics similarity measures into combined similarity measures, and may retrieve video segments based on the combined similarity measures.

20 Claims, 12 Drawing Sheets

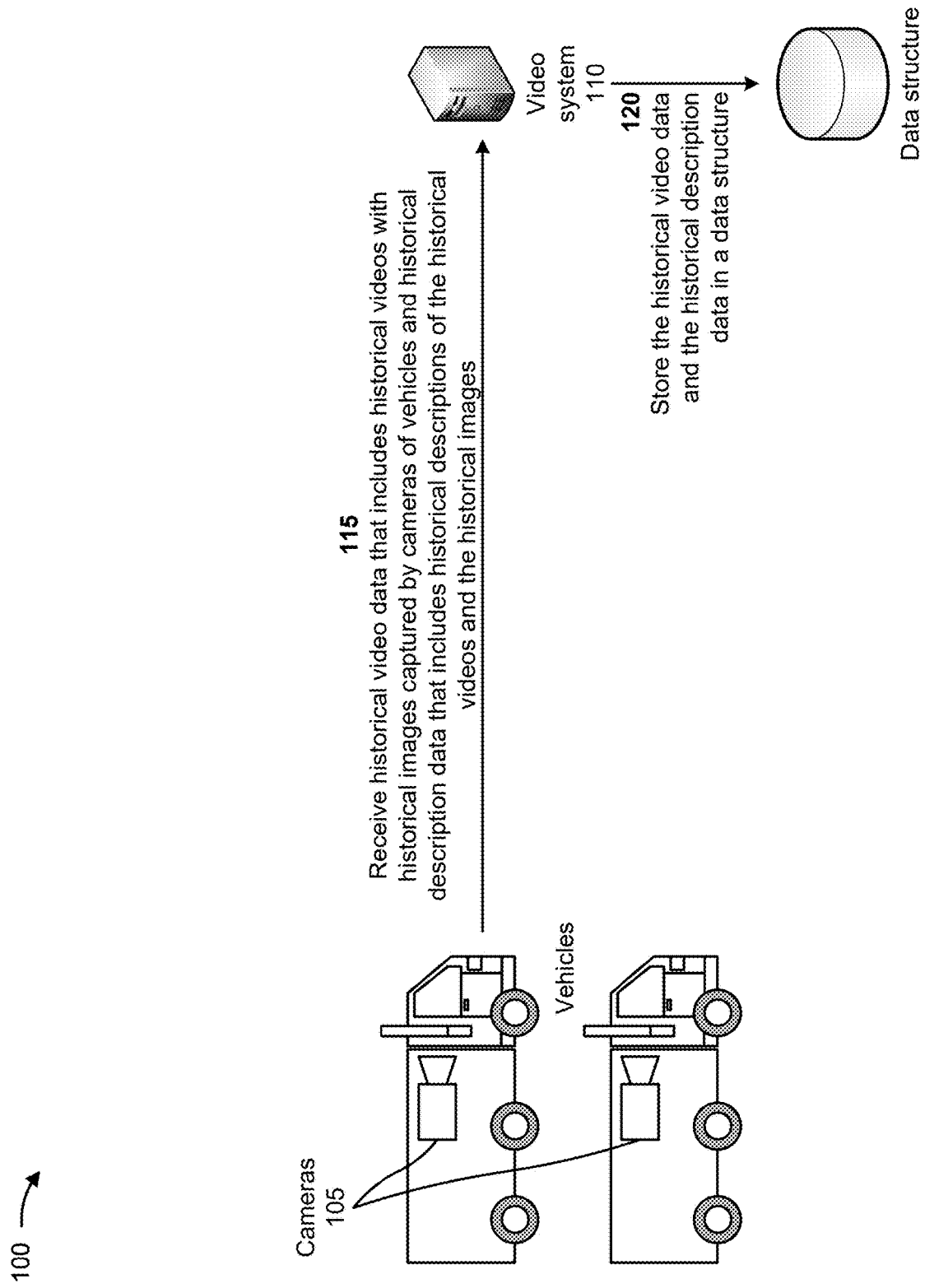

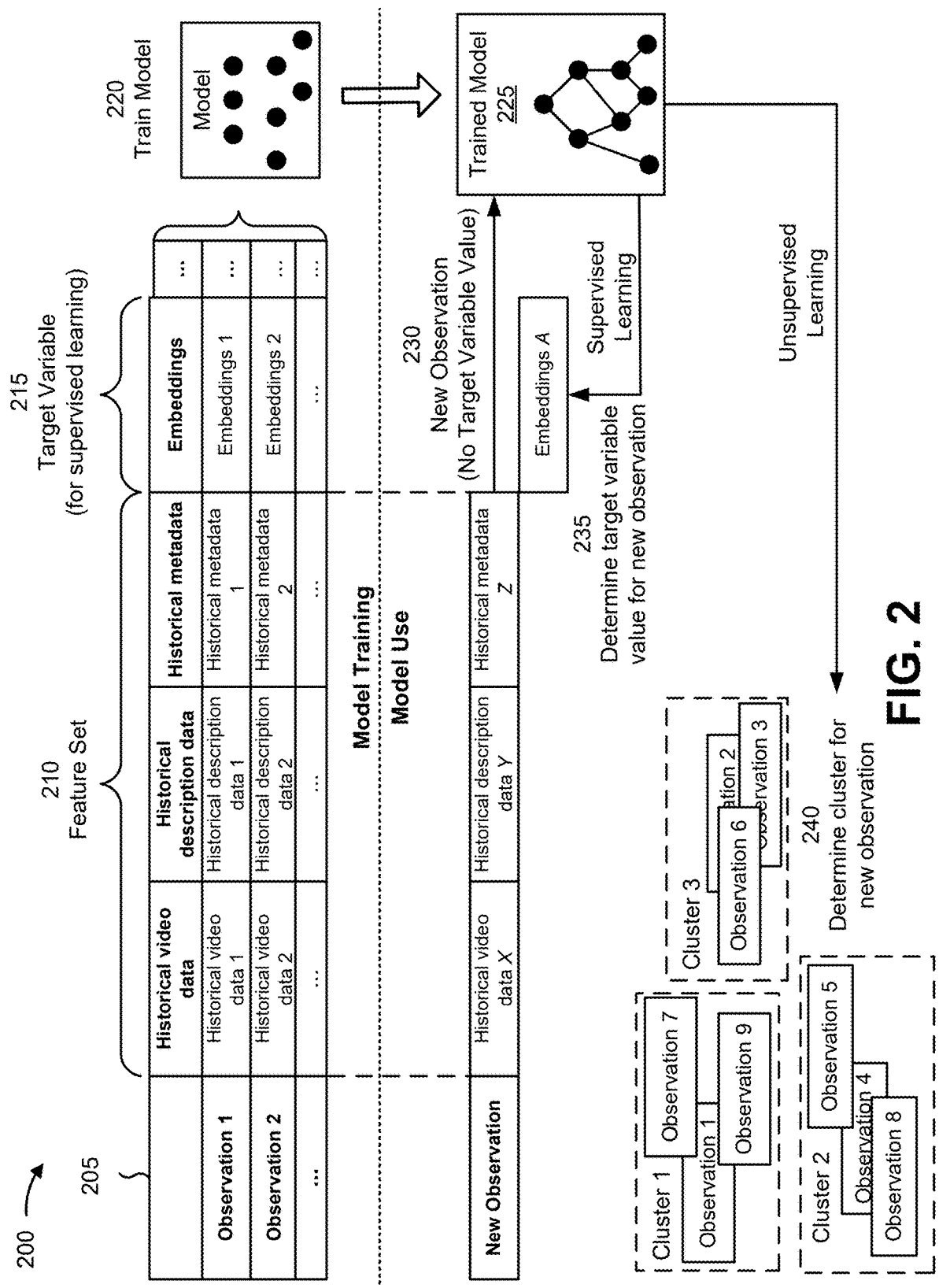

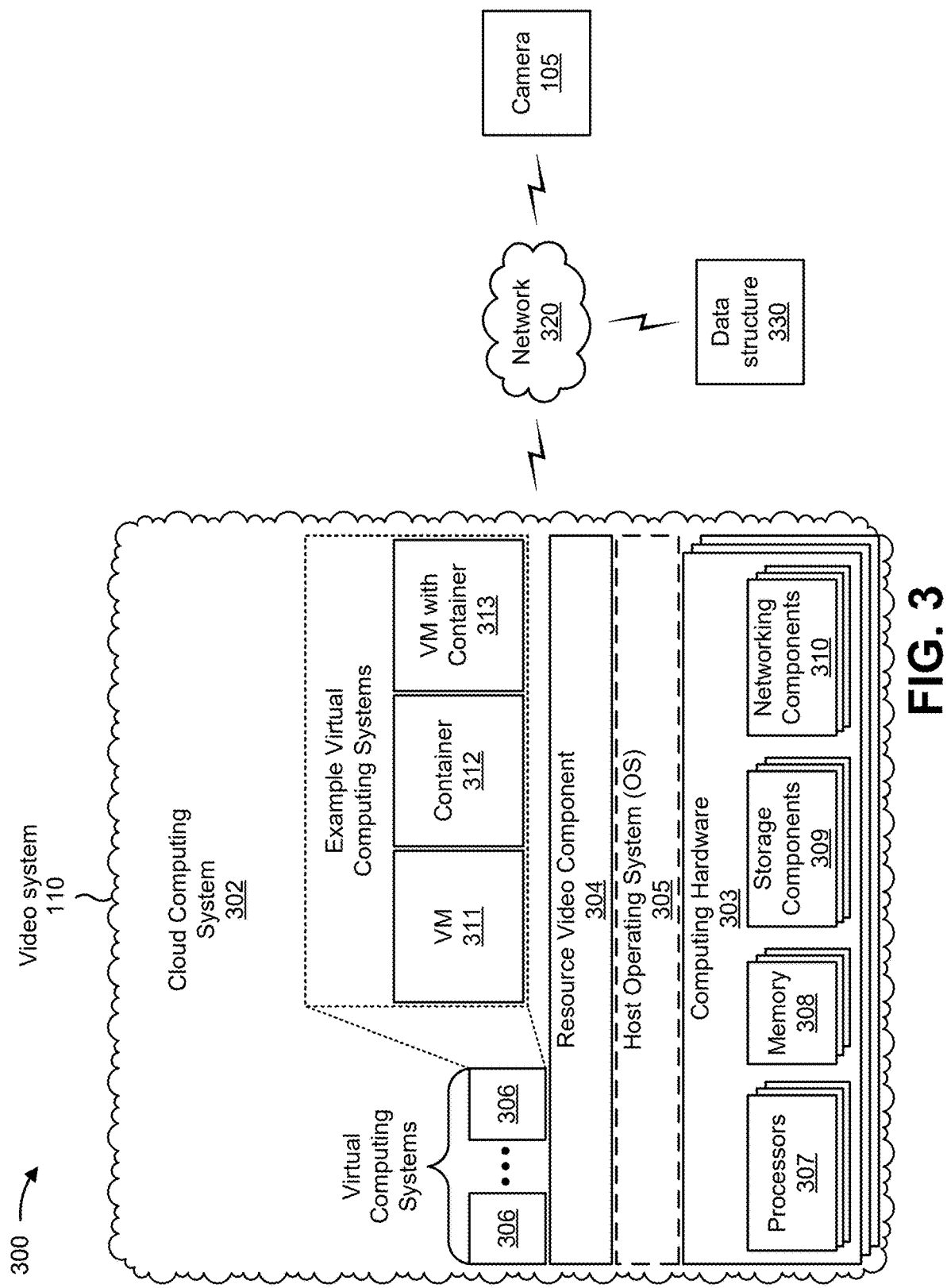

US 12,547,660 B1

SYSTEMS AND METHODS FOR RETRIEVING RELEVANT VIDEO FOOTAGE BASED ON A NATURAL LANGUAGE QUERY

BACKGROUND

In vehicular operations, dashcams may be utilized for monitoring and recording continuous video footage to assist in driver safety, liability assessments, and fleet management.

BRIEF DESCRIPTION OF THE DRAWINGS

FIGS. 1A-1H are diagrams of an example associated with retrieving relevant video footage based on a natural language query.

FIG. 2 is a diagram illustrating an example of training and using a machine learning model.

FIG. 3 is a diagram of an example environment in which systems and/or methods described herein may be implemented.

DETAILED DESCRIPTION OF EXAMPLE EMBODIMENTS

Figure 1B:
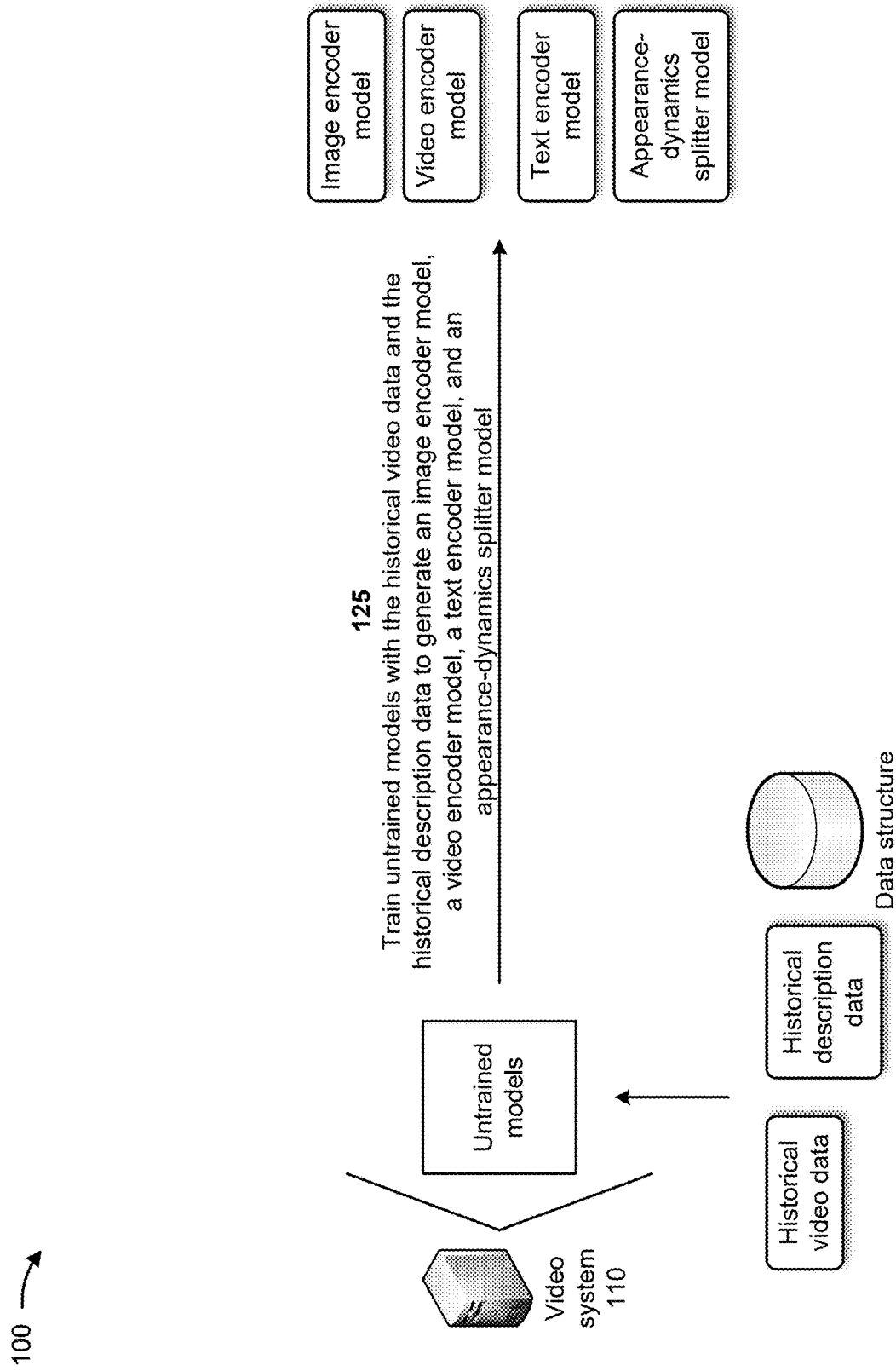

The following detailed description of example implementations refers to the accompanying drawings. The same reference numbers in different drawings may identify the same or similar elements.

In fleet management, dashcams may be installed in a multitude of vehicles, and may generate a volume of video data that is immense. Fleet managers and business owners may be inundated with thousands of hours of video footage, making it impractical to manually sift through each video to locate pertinent events or incidents. Current techniques for retrieving relevant video footage associated with a fleet of vehicles embed videos and focus mostly on appearance of scenes in the videos. However, current techniques are not able to capture dynamics of what happens in the scenes in the videos, making it difficult to search the videos for specific scenarios. Thus, current techniques for retrieving relevant video footage associated with a fleet of vehicles consume computing resources (e.g., processing resources, memory resources, communication resources, and/or the like), networking resources, and/or other resources associated with searching through thousands of hours of video footage for pertinent events, failing to identify pertinent events after searching through the video footage, failing to identify poor drivers based on failing to identify the pertinent events, handling accidents caused by the poor drivers in the future, and/or the like.

Some implementations described herein provide a video system that retrieves relevant video footage based on a natural language query. For example, the video system may receive video data that includes videos with images captured by a camera and description data that includes descriptions of the videos and the images, and may process the video data, with an image encoder model, to extract image embeddings. The video system may process the video data, with a video encoder model, to extract video embeddings, and may receive a query that includes a natural language description of a scene to be retrieved from the video data. The video system may split the query into an appearance subquery and a dynamics subquery, and may process the appearance subquery and the dynamics subquery, with a text encoder model, to generate an appearance query embedding and a dynamic query embedding. The video system may generate appearance similarity measures based on the image embeddings and the appearance query embedding, and may generate dynamic similarity measures based on the video embeddings and the dynamic query embedding. The video system may combine the appearance similarity measures and the dynamics similarity measures to generate combined similarity measures, and may retrieve video segments from the video data based on the combined similarity measures.

In this way, the video system retrieves relevant video footage based on a natural language query. For example, the video system may receive video data, including videos with images captured by a camera and descriptions of the videos and images. The video system may process this data using an image encoder model to extract image embeddings and a video encoder model to extract video embeddings. When a query with a natural language description of a desired scene is received, the video system may split the query into an appearance subquery and a dynamics subquery, and may process these subqueries with a text encoder model to generate corresponding query embeddings. The video system may generate appearance similarity measures based on the image embeddings and the appearance query embedding, and may generate dynamic similarity measures based on the video embeddings and the dynamic query embedding. The video system may combine the appearance and dynamic similarity measures, and may utilize the combined similarity measures to retrieve relevant video segments from the video data. In some implementations, the video system may process additional metadata, such as geospatial information and semantic content tags, to generate metadata similarity measures, which are included in the combined similarity measures to enhance the precision of the retrieval process.

Thus, the video system may conserve computing resources, networking resources, and/or other resources that would have otherwise been consumed by searching through thousands of hours of video footage for pertinent events, failing to identify pertinent events after searching through the video footage, failing to identify poor drivers based on failing to identify the pertinent events, handling accidents caused by the poor drivers in the future, and/or the like. The use of embeddings and similarity measures allows for a reduction in the computational load required to analyze and compare large volumes of video data. Furthermore, the video system may optimize the storage of video data by enabling more precise indexing, which allows for quicker retrieval and reduces an amount of data bandwidth needed when searching and accessing desired video segments.

FIGS. 1A-1H are diagrams of an example 100 associated with retrieving relevant video footage based on a natural language query. As shown in FIGS. 1A-1H, the example 100 includes cameras 105, vehicles, and a data structure associated with a video system 110. The cameras 105 may capture video of objects (e.g., packages, cargo, pedestrians, traffic signs, traffic signals, road markers, drivers, animals, and/or the like) associated with the vehicles. The cameras 105 may include dashcams of the vehicles, forward-facing cameras of the vehicles, side cameras of the vehicles, rear cameras of the vehicles, cameras not associated with the vehicles but that capture vehicle traffic, and/or the like. The data structure may include a database, a table, a list, and/or the like that stores data. The video system 110 may include a system that retrieves relevant video footage based on a natural language query. Further details of the cameras 105, the vehicles, the data structure, and the video system 110 are provided elsewhere herein. Although implementations are described herein as being performed by the video system 110, one or more of the implementations may be performed by the cameras 105 or by a combination of the cameras 105 and the video system 110.

As shown by FIG. 1A, and by reference number 115, the video system 110 may receive historical video data that includes historical videos with historical images captured by the cameras 105 and historical description data that includes historical descriptions of the historical videos and the historical images. For example, the cameras 105 may capture videos over time, e.g., when they are installed in vehicles, the cameras 105 may capture video during operation of the vehicles. The videos captured over time may be referred to as historical videos comprised of historical images (e.g., frames of the videos). The combination of the historical videos with the historical images may be referred to as the historical video data. Historical descriptions of the historical videos may be referred to as historical description data. The cameras 105 or the vehicles may provide the historical video data and the historical description data to the video system 110, and the video system 110 may receive historical video data and the historical description data from the cameras 105 or the vehicles. In some implementations, the video system 110 may continuously receive the historical video data and the historical description data from the cameras 105 or the vehicles, may periodically receive the historical video data and the historical description data from the cameras 105 or the vehicles, may receive the historical video data and the historical description data from cameras 105 or the vehicles based on requesting the historical video data and the historical description data, and/or the like.

The historical video data may include the videos and the images captured during the operation of the vehicles, and the historical description data may include metadata or annotations describing the content of the videos and images. The cameras 105 may be strategically positioned on the vehicles to capture various perspectives, such as forward-facing, side-facing, rear-facing, and in-cabin views, to monitor and assist drivers in avoiding dangerous driving behaviors. In some implementations, the historical video data and the historical description data may be stored in long-term storage systems and retrieved by the video system 110 when needed for analysis. For example, the cameras 105 or the vehicles may store the historical video data and the historical description data in the data structure, and the video system 110 may receive the historical video data and the historical description data from the data structure.

As further shown in FIG. 1A, and by reference number 120, the video system 110 may store the historical video data and the historical description data in the data structure. For example, the video system 110 may utilize the data structure to organize and store the received historical video data and historical description data. The data structure may facilitate efficient retrieval and indexing of the stored data, enabling the video system 110 to quickly access and process the historical video data and description data for further analysis and querying. In some implementations, the video system 110 may catalog the historical video data and the historical description data within a structured database. For example, a relational database may be used to systematically arrange and track historical records. Additionally, or alternatively, the video system 110 may index the historical video data and description data in a hierarchical data structure for efficient retrieval. Indexing can greatly enhance the speed and precision of data searches.

In some implementations, the video system 110 may utilize a structured query language database, a graph database, or another type of flexible data structure to organize and store the historical video data and historical description data. For example, the structured query language database may manage unstructured data, and the graph database may represent data relationships effectively. Additionally, or alternatively, the video system 110 may employ a distributed storage system, such as a cloud-based storage service, to manage the historical video data and historical description data. Cloud-based services offer scalable storage capacities and accessibility for handling large datasets. Additionally, or alternatively, the video system 110 may implement a hybrid storage solution combining relational and non-relational databases to handle the historical video data and the historical description data. In some implementations, the video system 110 may utilize the stored data to train machine learning models, such as image encoder models and video encoder models, to improve an accuracy and an effectiveness of the video system 110 in retrieving relevant video footage based on natural language queries.

As shown in FIG. 1B, and by reference number 125, the video system 110 may train untrained models with the historical video data and the historical description data to generate an image encoder model, a video encoder model, a text encoder model, and an appearance-dynamics splitter model. For example, the video system 110 may utilize the historical video data and the historical description data as training data for training the untrained models. These untrained models may include various machine learning models that have not yet been exposed to the specific historical data associated with cameras 105. The trained models, resulting from training the untrained models, may include the image encoder model, the video encoder model, the text encoder model, and the appearance-dynamics splitter model. In some implementations, the training process may include supervised learning, where the untrained models are provided with labeled pairs of historical videos and descriptions to learn relationships between visual content and corresponding textual descriptions.

In some implementations, the video system 110 may utilize the historical video data and historical description data to initialize the image encoder model, the video encoder model, the text encoder model, and the appearance-dynamics splitter model. The initialization process may include a preliminary setup of model parameters, allowing further tuning and optimization during subsequent training phases. Additionally, or alternatively, the video system 110 may utilize the historical video data and historical description data to configure the image encoder model, the video encoder model, the text encoder model, and the appearance-dynamics splitter model. The configuration may include setting initial weights and biases within the models based on patterns discerned from the historical video data and historical description data. Additionally, or alternatively, the video system 110 may utilize a deep learning technique to train the image encoder model, the video encoder model, the text encoder model, and the appearance-dynamics splitter model using the historical video data and the historical description data. In some implementations, the video system 110 may store the image encoder model, the video encoder model, the text encoder model, and the appearance-dynamics splitter model in the data structure, and/or may provide the image encoder model and the video encoder model to each of the cameras 105 or vehicles.

The image encoder model may be trained to recognize and encode appearance features from video frames. Appearance features may include distinct visual elements, such as colors, shapes, and textures observed within individual video frames. The video encoder model may be trained to capture both appearance and dynamic features from video footage. Dynamic features may pertain to motion and temporal changes within video sequences, enabling a broader understanding of scene evolution over time. The image encoder model and the video encoder model may be based on a convolutional neural network (CNN) architecture. The text encoder model may be trained to convert textual descriptions into numerical embeddings that are comparable to image and video embeddings. Numerical embeddings may facilitate seamless data integration, allowing textual inputs to be processed alongside visual inputs. The text encoder model may include a transformer-based model. The appearance-dynamics splitter model may be trained to divide or split a query sentence into appearance and dynamic subqueries. This splitting process may enable the video system 110 to independently address static and motion-related implementations within scene descriptions. The appearance-dynamics splitter model may include a bidirectional long short-term memory (LSTM) network model.

Figure 1C:
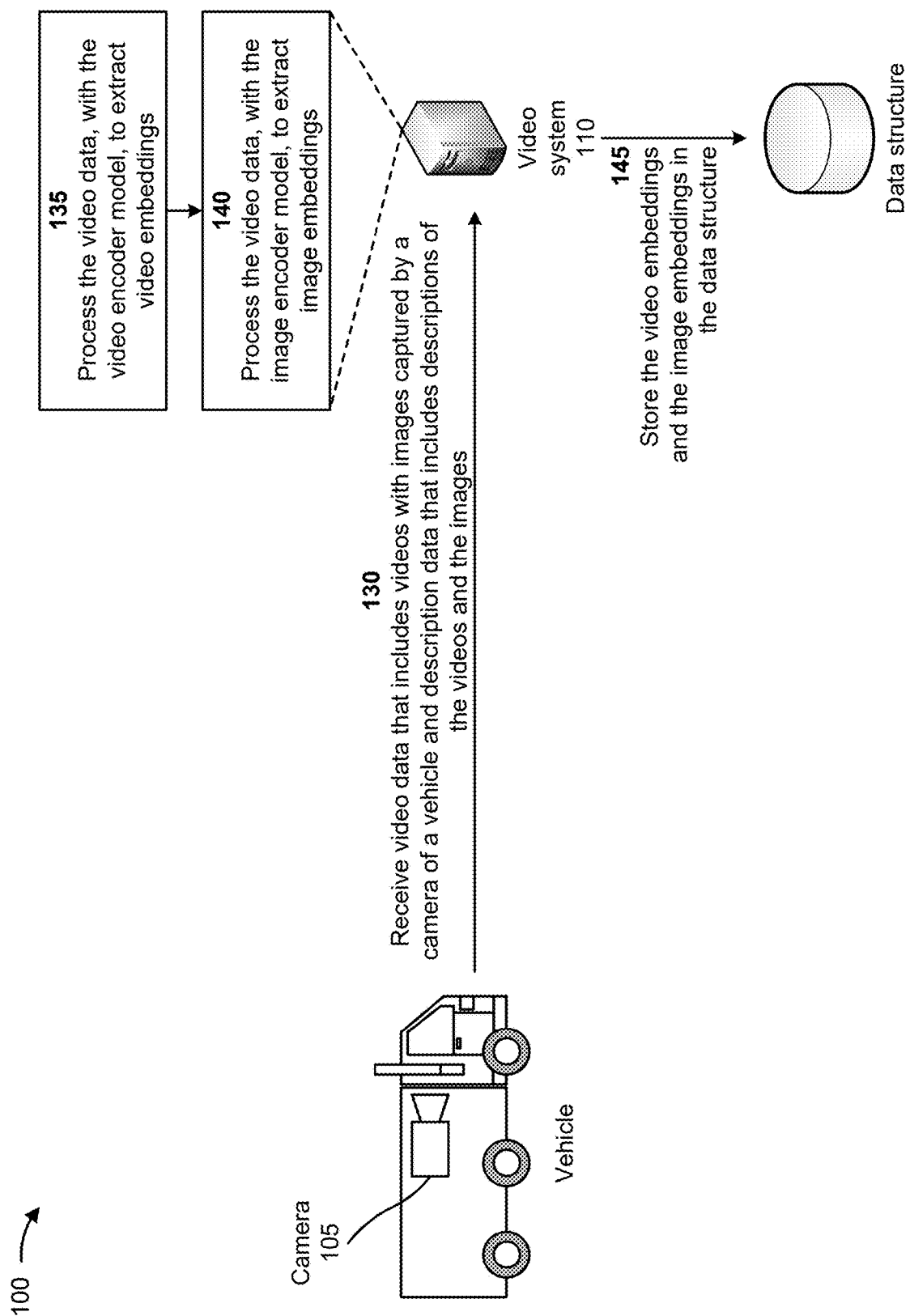

As shown in FIG. 1C, and by reference number 130, the video system 110 may receive video data that includes videos with images captured by the camera 105 and description data that includes descriptions of the videos and the images. For example, the camera 105, installed in the vehicle, may capture video data that includes videos with images and may generate description data that provides context and metadata about content of the videos and the images of the video data. The camera 105 may provide the video data and the description data to the video system 110, and the video system 110 may receive the video data and the description data from the camera 105 or the vehicle, facilitating retrieval and analysis of relevant video segments. In some implementations, the video system 110 may continuously receive the video data and the description data from the camera 105 or the vehicle, may periodically receive the video data and the description data from the camera 105 or the vehicle, may receive the video data and the description data from the camera 105 or the vehicle based on requesting the video data and the description data, and/or the like.

As further shown in FIG. 1C, and by reference number 135, the video system 110 may process the video data, with the video encoder model, to extract video embeddings. For example, the video system 110 may utilize the video encoder model to extract the video embeddings based on the video data. Alternatively, the camera 105 or the vehicle may utilize the video encoder model to extract the video embeddings based on the video data. The video encoder model may analyze the video data to generate numerical representations, or embeddings, that capture both an appearance and dynamic features of the video data. These embeddings may enable efficient comparison and retrieval of video segments based on their visual and temporal characteristics. In some implementations, processing the video data, with the video encoder model, to extract the video embeddings may include the video system 110 deriving the video embeddings.

As further shown in FIG. 1C, and by reference number 140, the video system 110 may process the video data, with the image encoder model, to extract image embeddings. For example, the video system 110 may utilize the image encoder model to extract the image embeddings based on the video data. Alternatively, the camera 105 or the vehicle may utilize the video encoder model to extract the image embeddings based on the video data. The image encoder model may focus on appearance features of individual video frames (e.g., images), and may generate the image embeddings that represent static visual elements, such as objects, colors, and textures within the captured images. The image embeddings may complement the video embeddings by providing detailed information about static visual content of the video data, rather than dynamic visual content of the video data.

As further shown in FIG. 1C, and by reference number 145, the video system 110 may store the video embeddings and the image embeddings in the data structure. For example, after generating or receiving the video embeddings and the image embeddings, the video system 110 may store the video embeddings and the image embeddings in the data structure. The data structure may organize and index the video embeddings and the image embeddings, allowing for efficient retrieval and querying. By storing the video embeddings and the image embeddings, the video system 110 may ensure quick access to relevant video segments based on various search criteria, such as natural language queries. In some implementations, storing the video embeddings and the image embeddings in the data structure may include the video system 110 archiving both the video embeddings and the image embeddings in a structured data repository.

Figure 1D:
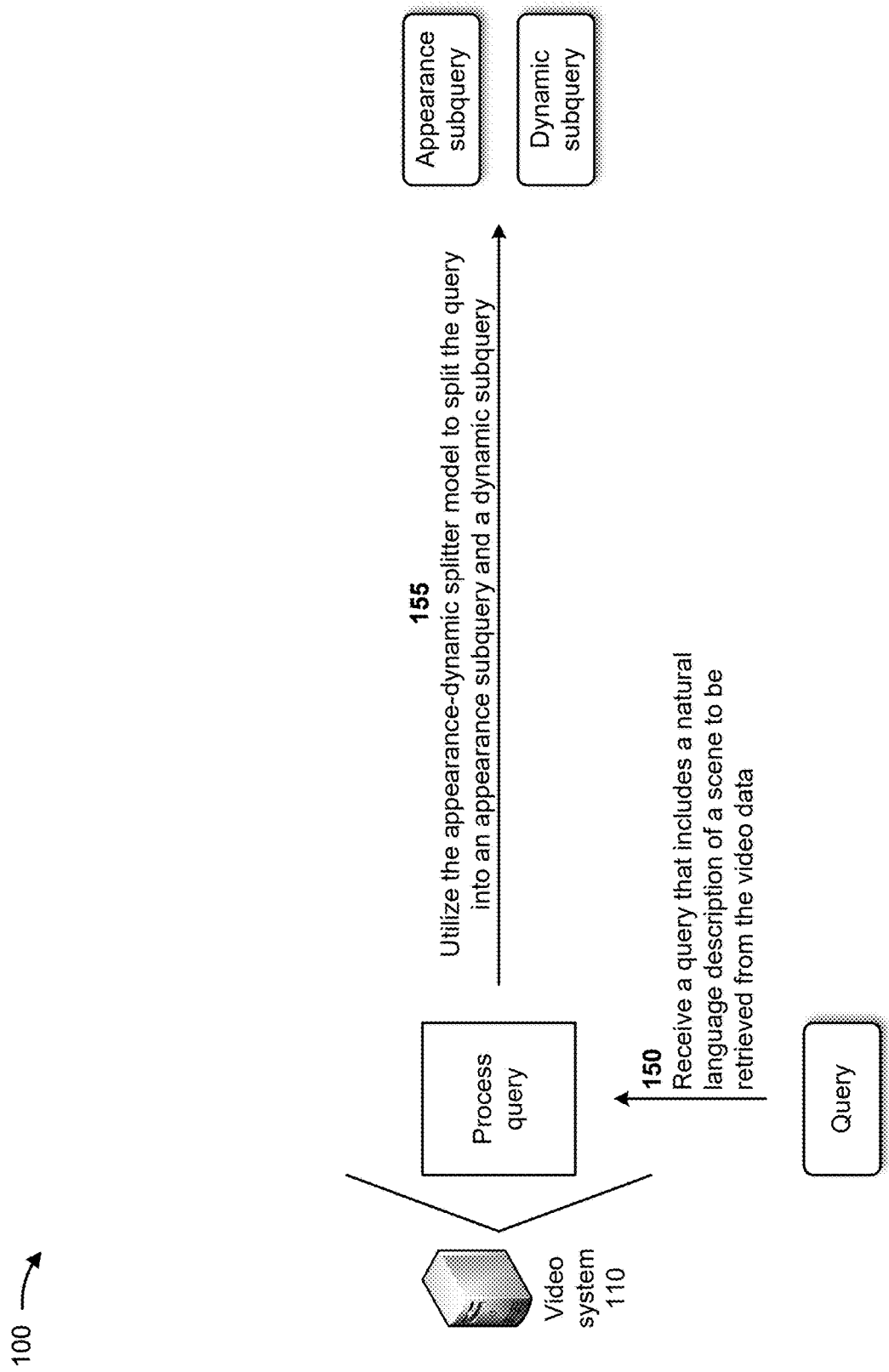

As shown in FIG. 1D, and by reference number 150, the video system 110 may receive a query that includes a natural language description of a scene to be retrieved from the video data. For example, the video system 110 may receive (e.g., from a user of the video system 110) the query that includes the natural language description of the scene for retrieval from the video data. In some implementations, the video system 110 may receive such the query through a voice recognition system where the user verbally describes the scene for which to search. Additionally, or alternatively, the video system 110 may provide an interface to the user (e.g., via a user device) to obtain the query that includes the natural language description of the scene. For example, the video system 110 may prompt the user with specific questions to better capture the context of the scene and to receive the query. Additionally, or alternatively, the query may be received (e.g., by the video system 110) via a graphical user interface where the user types in the query that includes the natural language description of the scene of interest. For example, the graphical user interface may include a search bar where the user types in the query, and the video system 110 processes this input.

As further shown in FIG. 1D, and by reference number 155, the video system 110 may utilize the appearance-dynamic splitter model to split the query into an appearance subquery and a dynamic subquery. For example, the video system 110 may process the query, with the appearance-dynamic splitter model, to divide the query into the appearance subquery and the dynamic subquery. In some implementations, the appearance-dynamic splitter model may analyze keywords and phrases in the query to categorize certain portions of the query under appearance and other portions of the query under dynamics. Additionally, or alternatively, the appearance-dynamic splitter model may utilize natural language processing techniques to differentiate between static and active components described in the query. For example, visual descriptors may serve as the appearance subquery and action verbs may serve as the dynamic subquery. The appearance-dynamic splitter model may include a small language model that is trained to classify each part of a query as either pertaining to the appearance or the dynamics of a scene.

The appearance subquery may include terms related to the appearance of objects or scenes, such as terms related to static visual elements and physical characteristics of objects or scenes. For example, phrases describing colors, shapes, and sizes of objects may be included in the appearance subquery. Additionally, or alternatively, the appearance-related terms extracted from the query may be compiled into the appearance subquery by the appearance-dynamic splitter model. For example, descriptors, such as "red ball," "large tree," "green grass," "sparkling water," or "snow-capped mountains," may be provided in the appearance subquery.

The dynamic subquery may include terms related to evolution or movement of objects within the scene. For example, descriptions like "cars moving," "people walking," "traffic flow," "dancers performing," or "a soccer ball being kicked" may be included in the dynamic subquery. Additionally, or alternatively, verbs or action phrases within the query that indicate movement or transition may be included in the dynamic subquery. The dynamic subquery may enable the video system 110 to identify specific segments within the video data where such actions or movements are occurring, facilitating efficient retrieval of relevant video clips.

Figure 1E:
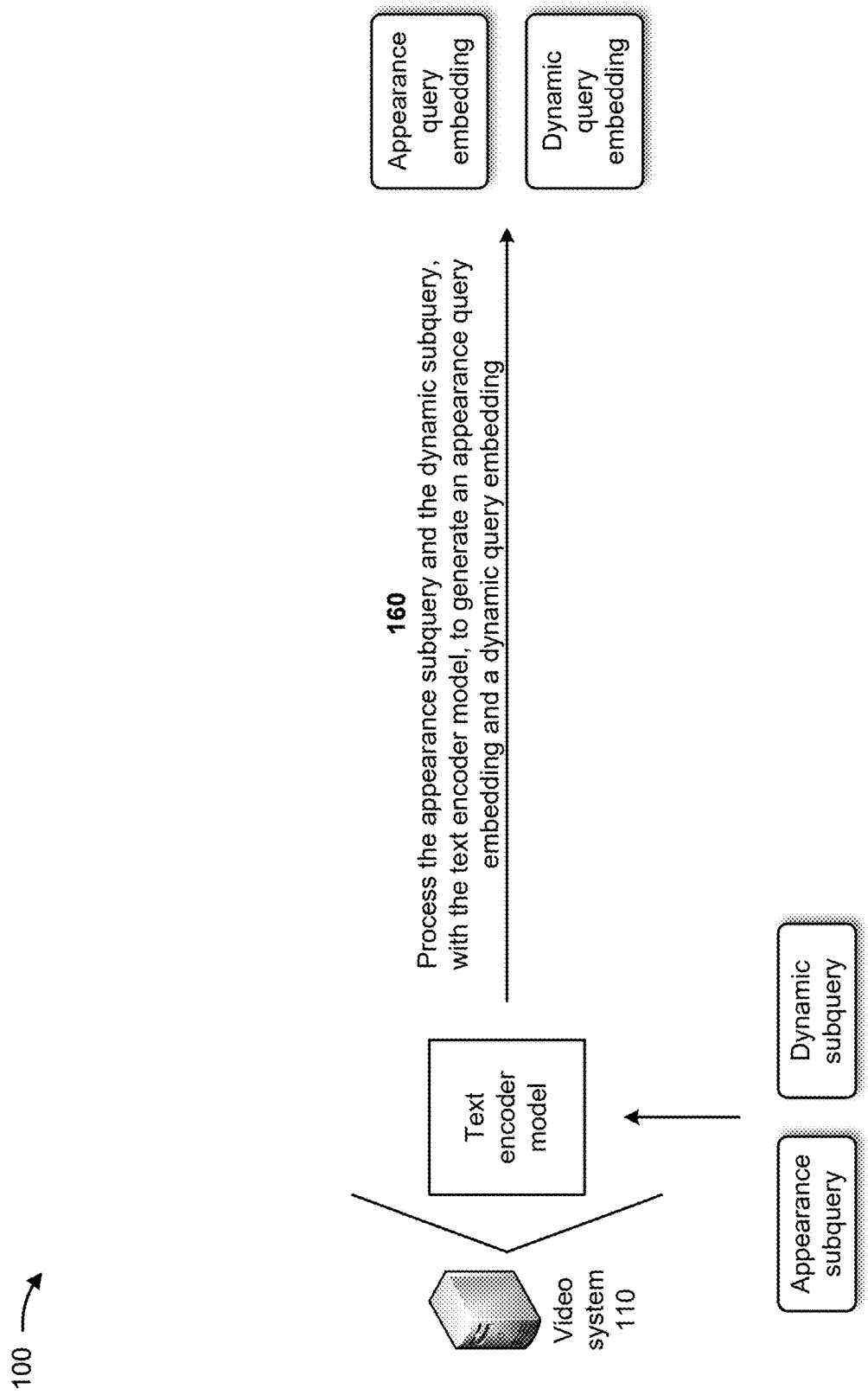

As shown in FIG. 1E, and by reference number 160, the video system 110 may process the appearance subquery and the dynamic subquery, with the text encoder model, to generate an appearance query embedding and a dynamic query embedding. For example, the video system 110 may utilize the text encoder model to convert the appearance subquery and the dynamic subquery into numerical embeddings that represent the visual and temporal characteristics described in the subqueries. In some implementations, the video system 110 may process the appearance subquery, with the text encoder model, to generate the appearance query embedding, and may process the dynamic subquery, with the text encoder model, to generate the dynamic query embedding. The appearance query embedding may capture the static visual elements specified in the appearance subquery, while the dynamic query embedding may capture the motion and temporal changes described in the dynamic subquery. These embeddings may enable the video system 110 to efficiently search and retrieve video segments that match the specified visual and dynamic criteria.

Additionally, or alternatively, the text encoder model may include a neural network model that encodes the appearance subquery into the appearance query embedding and the dynamic subquery into the dynamic query embedding. A neural network model, especially a deep learning model, may extract high-level features from the subqueries, which can improve the accuracy of matching descriptions with video segments. Additionally, or alternatively, the video system 110 may use separate text encoder models to independently process the appearance subquery and the dynamic subquery, producing the respective embeddings. This separation may provide for more specialized processing tailored to the unique characteristics of appearance versus dynamic information.

Additionally, or alternatively, the text encoder model may include a natural language processing model that converts the appearance subquery and dynamic subquery into embeddings that reflect the described visual and temporal features. A natural language processing model may effectively handle and interpret the nuances of human language in the subqueries. Additionally, or alternatively, the text encoder model may include an embedding generation model that transforms the appearance subquery into the appearance query embedding and the dynamic subquery into the dynamic query embedding. An embedding generation model may transform complex textual input into a structured numerical format that machines can use for comparison and retrieval. Additionally, or alternatively, the text encoder model may include an advanced encoding model that derives the appearance query embedding and the dynamic query embedding from the respective subqueries. An advanced encoding model may include a transformer model or a recurrent neural network model that capture dependencies in data sequences.

Figure 1F:
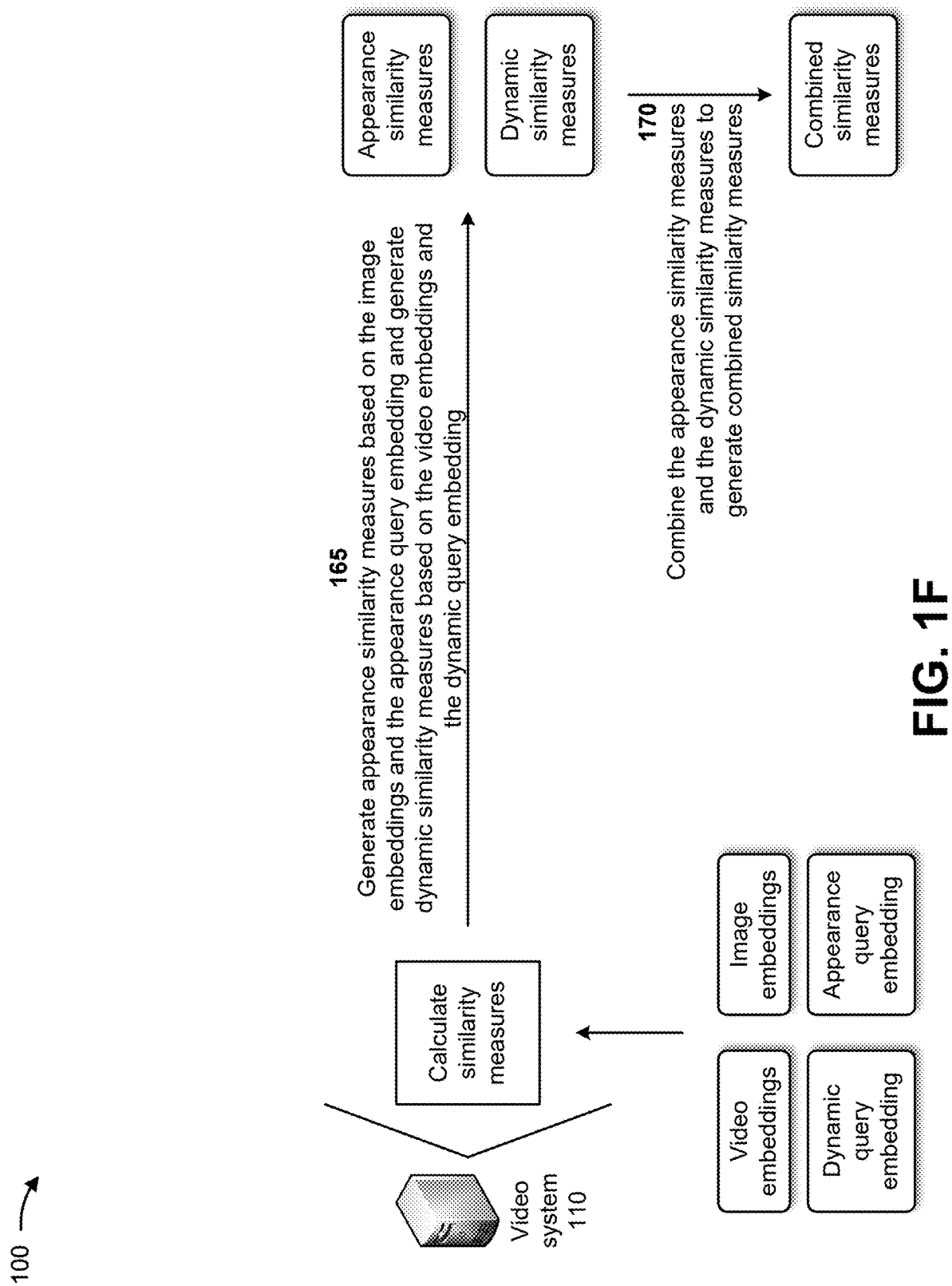

As shown in FIG. 1F, and by reference number 165, the video system 110 may generate appearance similarity measures based on the image embeddings and the appearance query embedding and may generate dynamic similarity measures based on the video embeddings and the dynamic query embedding. For example, the video system 110 may utilize the image embeddings and the appearance query embedding to calculate the appearance similarity measures that represent how closely captured image features match visual descriptions provided in the appearance subquery. The video system 110 may utilize the video embeddings and the dynamic query embedding to calculate the dynamic similarity measures that represent how closely captured dynamic features match dynamic descriptions provided in the dynamic subquery.

Additionally, or alternatively, the video system 110 may calculate appearance similarity scores by comparing the image embeddings with the appearance query embedding to determine how well the images in the video data match the visual elements described in the query. The visual elements may include characteristics such as color, shape, or texture. Additionally, or alternatively, the video system 110 may determine dynamic similarity scores by comparing the video embeddings with the dynamic query embedding to assess a match between the video's motion characteristics and the actions described in the query. This may involve comparing movements of objects, trajectories, or events in the video data to the dynamic elements specified in the query. In some implementations, the video system 110 may calculate the appearance similarity measures and the dynamic similarity measures using mathematical distance metrics, such as a Euclidean distance or a cosine similarity to quantify similarity levels. These distance metrics may provide a quantitative way to measure how closely the query embeddings match the content of the video data.

As further shown in FIG. 1F, and by reference number 170, the video system may combine the appearance similarity measures and the dynamic similarity measures to generate combined similarity measures. For example, the video system 110 may integrate the appearance similarity measures and the dynamic similarity measures to produce the combined similarity measures that reflect both the static and dynamic implementations of the query. Additionally, or alternatively, the video system 110 may generate the combined similarity measures by reflecting both static and dynamic elements of the query. This may ensure a balanced consideration of visual and motion-related features in a search process. Additionally, or alternatively, the video system 110 may generate the combined similarity measures by calculating a weighted average of the appearance similarity measures and the dynamic similarity measures, or through other aggregation techniques that balance the contributions of the appearance similarity measures and the dynamic similarity measures. For example, the video system 110 may assign specific weights to the appearance similarity measures and the dynamic similarity measures based on their importance to the query. The combined similarity measures may enable the video system 110 to identify and retrieve video segments that best match the natural language query, incorporating both visual content and motion dynamics. This may provide for more accurate and relevant search results reflecting the complex nature of the query.

Figure 1G:
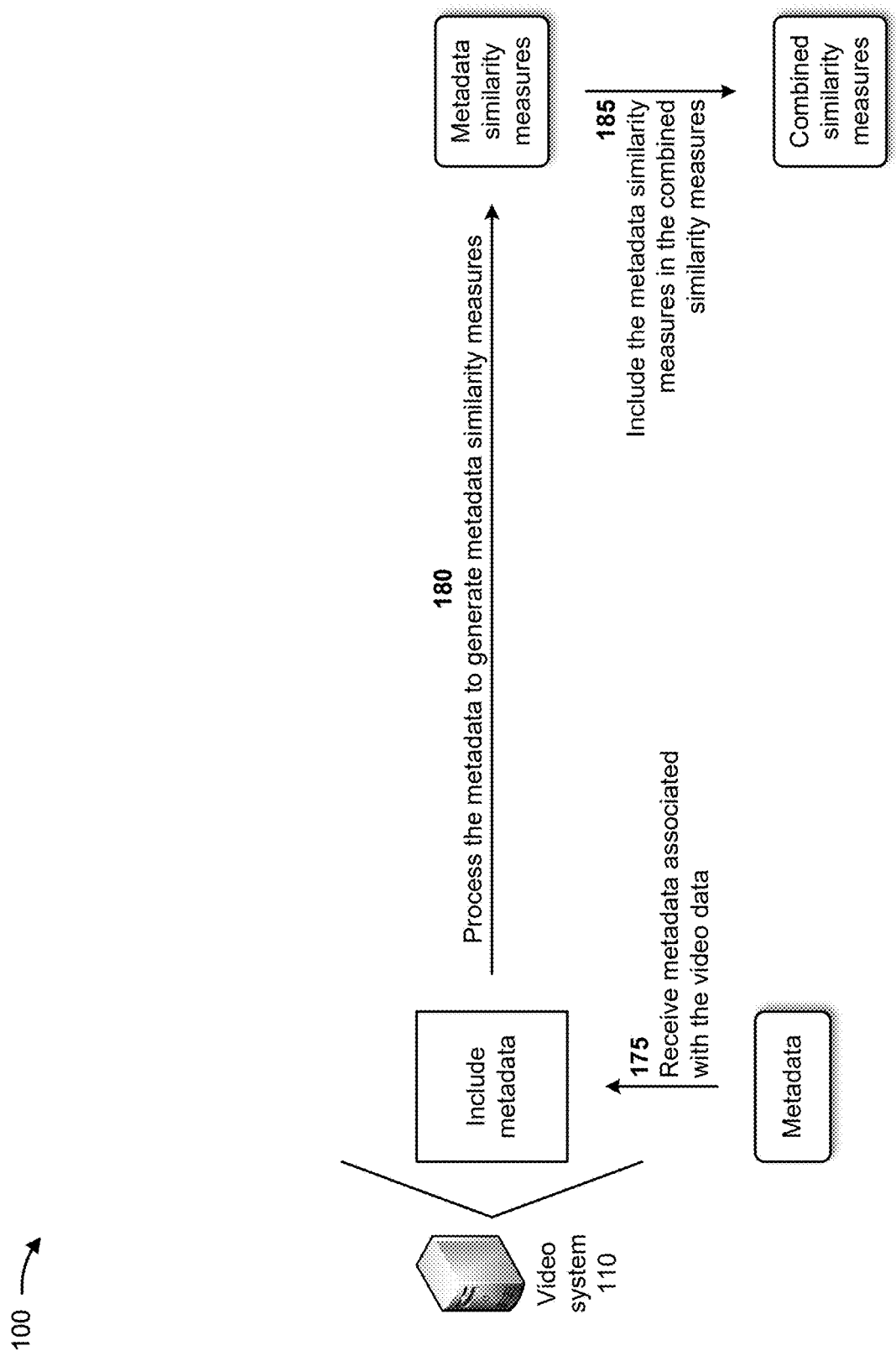

As shown in FIG. 1G, and by reference number 175, the video system 110 may receive metadata associated with the video data. For example, the video system 110 may obtain metadata that describes or provides additional context to the video data captured by the cameras 105. This metadata may include various forms of information, such as global positioning system (GPS) coordinates, timestamps, environmental conditions, object tags, and semantic labels associated with the video data. In some implementations, the video system 110 may collect, from the camera 105 or the vehicle, supplementary context, such as GPS data, timestamps, object identifiers, and environmental conditions, associated with the video data. Additionally, or alternatively, the metadata associated with the video data may include geospatial coordinates, time-based information, semantic tags, and/or the like.

As further shown in FIG. 1G, and by reference number 180, the video system 110 may process the metadata to generate metadata similarity measures. For instance, the video system 110 may analyze the received metadata to create numerical representations or embeddings that can be compared to query embeddings. The metadata similarity measures may be derived from a comparison of the metadata embeddings with the query embeddings, providing an additional layer of contextual information for video retrieval. In some implementations, processing the metadata to generate the metadata similarity measures may include the video system 110 transforming the metadata into numerical representations. For example, the video system 110 may convert the metadata into embeddings to facilitate comparison with the query embeddings. Additionally, or alternatively, the metadata similarity measures may assist in contextualizing the video data for retrieval purposes.

As further shown in FIG. 1G, and by reference number 185, the video system 110 may include the metadata similarity measures in the combined similarity measures. For example, the video system 110 may integrate the metadata similarity measures with the appearance similarity measures and dynamic similarity measures to form more comprehensive combined similarity measures. The combined similarity measures, enhanced with the metadata similarity measures, may ensure that the retrieval process considers not only the visual and temporal characteristics of the video data but also the contextual metadata, thereby enhancing the precision and relevance of the retrieved video segments. In some implementations, the video system 110 may merge the metadata similarity measures with the appearance similarity measures and the dynamic similarity measures to create final combined similarity measures. In some implementations, the combined similarity measures may be generated by calculating a weighted average of the appearance similarity measures, the dynamic similarity measures, and the metadata similarity measures. The weights may be determined based on empirical optimization and may be adjusted based on feedback.

Figure 1H:
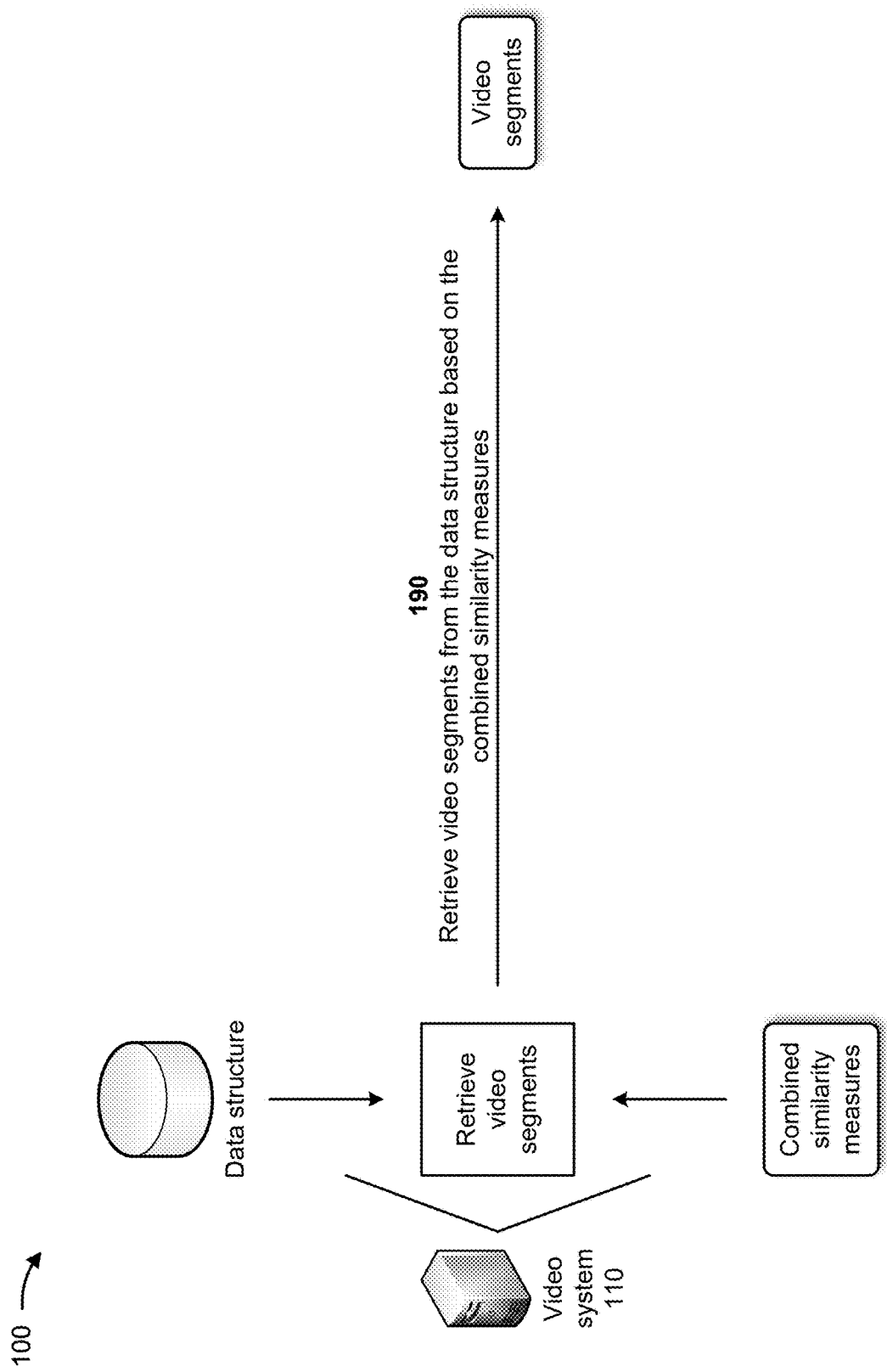

As shown in FIG. 1H, and by reference number 190, the video system 110 may retrieve video segments from the data structure based on the combined similarity measures. For example, the video system 110 may utilize the combined similarity measures to query the data structure and to identify video segments that match the visual and dynamic characteristics specified in the natural language query. The retrieval process may include the video system 110 accessing the organized and indexed video data, as indicated by the combined similarity measures, and extracting the relevant video segments that best correspond to the query. This may ensure that the retrieved video segments are the most pertinent and accurate representations of the scene described in the query. The video system may then provide the retrieved video segments for further analysis, display, or other processing steps. In some implementations in the context of fleet management, the video system 110 may utilize the retrieved video segments to more effectively train drivers in a fleet of vehicles by showing the drivers specific instances of driving behaviors that needs improvement.

In some implementations, the retrieval process may include the video system 110 generating metadata tags for the identified video segments to facilitate easier access and categorization in future searches. For example, the metadata tags may include information, such as timestamps, geospatial data, or specific events that occurred within the video segments, making it easier for users to locate and analyze specific parts of the video data. Additionally, or alternatively, the video system 110 may automatically flag and highlight critical events within the retrieved video segments based on predefined criteria. For example, the video system 110 may be pre-programmed to highlight incidents involving collisions or abrupt stops, allowing users to quickly focus on important events within the video data. Additionally, or alternatively, the video system 110 may prioritize video segments that have higher combined similarity measures, ensuring that the most relevant footage is presented first. As a result, users can more efficiently review the most pertinent video segments without sifting through less relevant content.

Additionally, or alternatively, after retrieving video segments, the video system 110 may present the video segments to the user for analysis or review. This may enable users to directly interact with and assess the retrieved video data, providing feedback or further instructions as necessary. Additionally, or alternatively, the video system 110 may store the retrieved video segments in a separate database for future retrieval and analysis. This may ensure that important video segments are preserved and can be accessed whenever required, further aiding in long-term analysis and recordkeeping.

Additionally, or alternatively, the video system 110 may process the combined similarity measures to refine the search results and ensure higher accuracy in matching the query. For example, by continually analyzing retrieval results and adjusting the combined similarity measures based on user feedback, the video system 110 may improve retrieval accuracy over time. Additionally, or alternatively, the video system 110 may utilize the retrieved video segments for generating reports or visual summaries pertinent to the user's needs. These reports may provide an overview of the most significant events or patterns detected in the video data, supporting decision-making processes.

Additionally, or alternatively, the video system 110 may utilize machine learning models to continuously improve the accuracy and relevance of video segment retrievals based on user feedback. Incorporating user feedback into the learning process allows the video system 110 to fine-tune its retrieval capabilities, making the video system 110 more responsive to the specific needs and preferences of users. Additionally, or alternatively, the retrieved video segments may be integrated into a larger video analysis framework for comprehensive monitoring and assessment. This integration may facilitate the combination of video data with other sources of information, providing a more holistic understanding of the monitored environment.

In this way, the video system 110 retrieves relevant video footage based on a natural language query. For example, the video system 110 may receive video data, including videos with images captured by a camera 105 and descriptions of the videos and images. The video system 110 may process this data using an image encoder model to extract image embeddings and a video encoder model to extract video embeddings. When a query with a natural language description of a desired scene is received, the video system 110 may split the query into an appearance subquery and a dynamics subquery, and may process these subqueries with a text encoder model to generate corresponding query embeddings. The video system 110 may generate appearance similarity measures based on the image embeddings and the appearance query embedding, and may generate dynamic similarity measures based on the video embeddings and the dynamic query embedding. The video system 110 may combine the appearance and dynamic similarity measures, and may utilize the combined similarity measures to retrieve relevant video segments from the video data. In some implementations, the video system 110 may process additional metadata, such as geospatial information and semantic content tags, to generate metadata similarity measures, which are included in the combined similarity measures to enhance the precision of the retrieval process.

Thus, the video system 110 may conserve computing resources, networking resources, and/or other resources that would have otherwise been consumed by searching through thousands of hours of video footage for pertinent events, failing to identify pertinent events after searching through the video footage, failing to identify poor drivers based on failing to identify the pertinent events, handling accidents caused by the poor drivers in the future, and/or the like. The use of embeddings and similarity measures allows for a reduction in the computational load required to analyze and compare large volumes of video data. Furthermore, the video system 110 may optimize the storage of video data by enabling more precise indexing, which allows for quicker retrieval and reduces an amount of data bandwidth needed when searching and accessing desired video segments.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

FIG. 2 is a diagram illustrating an example 200 of training and using a machine learning model for retrieving relevant video footage based on a natural language query. The machine learning model training and usage described herein may be performed using a machine learning system. The machine learning system may include or may be included in a computing device, a server, a cloud computing environment, and/or the like, such as the video system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the video system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of historical video data, a second feature of historical description data, a third feature of historical metadata, and so on. As shown, for a first observation, the first feature may have a value of historical video data 1, the second feature may have a value of historical description data 1, the third feature may have a value of historical metadata 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "embeddings" and may include a value of embeddings 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of historical video data X, a second feature of historical description data Y, a third feature of historical metadata Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of embeddings A for the target variable of the stability for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a historical video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a historical description data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to retrieve relevant video footage based on a natural language query. The machine learning system enables recognition and/or identification of tens, hundreds, thousands, or millions of features and/or feature values for tens, hundreds, thousands, or millions of observations, thereby increasing accuracy and consistency and reducing delay associated with retrieving relevant video footage based on a natural language query relative to requiring computing resources to be allocated for tens, hundreds, or thousands of operators to manually retrieve relevant video footage based on a natural language query.

As indicated above, FIG. 2 is provided as an example. Other examples may differ from what is described in connection with FIG. 2.

FIG. 3 is a diagram of an example environment 300 in which systems and/or methods described herein may be implemented. As shown in FIG. 3, the environment 300 may include the video system 110, which may include one or more elements of and/or may execute within a cloud computing system 302. The cloud computing system 302 may include one or more elements 303-313, as described in more detail below. As further shown in FIG. 3, the environment 300 may include the camera 105, a network 320, and/or a data structure 330. Devices and/or elements of the environment 300 may interconnect via wired connections and/or wireless connections.

The camera 105 may include one or more devices capable of receiving, generating, storing, processing, providing, and/or routing information, as described elsewhere herein. The camera 105 may include a communication device and/or a computing device. For example, the camera 105 may include an optical instrument that captures videos (e.g., images and audio). The camera 105 may feed real-time video directly to a screen or a computing device for immediate observation, may record the captured video (e.g., images and audio) to a storage device for archiving or further processing, and/or the like. In some implementations, the camera 105 may include a dashcam of a vehicle, a forward-facing camera of a vehicle, a side camera of a vehicle, a rear camera of a vehicle, a camera not associated with vehicles but capturing vehicular traffic, and/or the like.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 110 may include one or more elements 303-313 of the cloud computing system 302, may execute within the cloud computing system 302, and/or may be hosted within the cloud computing system 302, in some implementations, the video system 110 may not be cloud-based (e.g., may be implemented outside of a cloud computing system) or may be partially cloud-based. For example, the video system 110 may include one or more devices that are not part of the cloud computing system 302, such as a device 400 of FIG. 4, which may include a standalone server or another type of computing device. The video system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of the environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
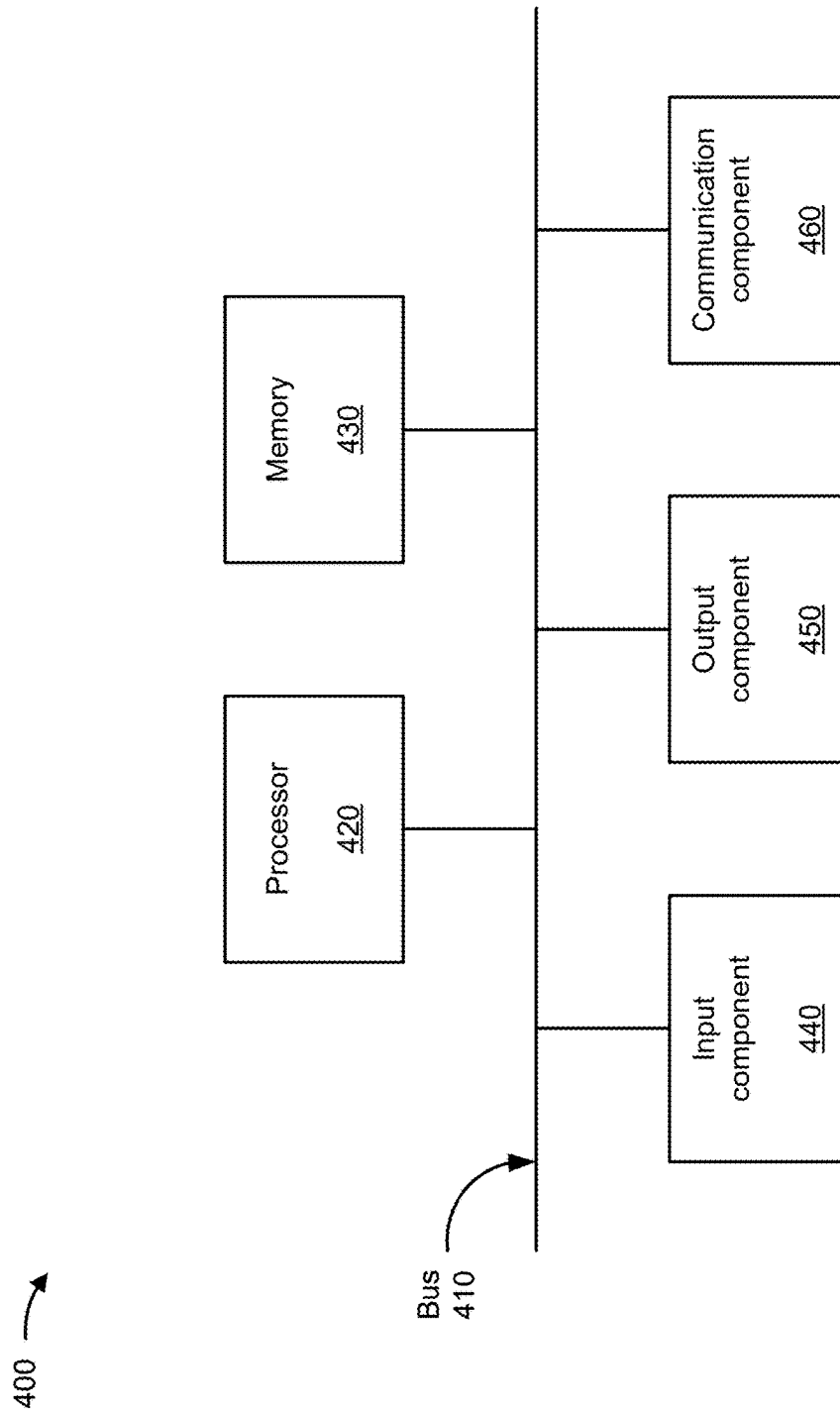
FIG. 4 is a diagram of example components of one or more devices of FIG. 3.

FIG. 4 is a diagram of example components of a device 400, which may correspond to the camera 105, the video system 110, and/or the data structure 330. In some implementations, the camera 105, the video system 110, and/or the data structure 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
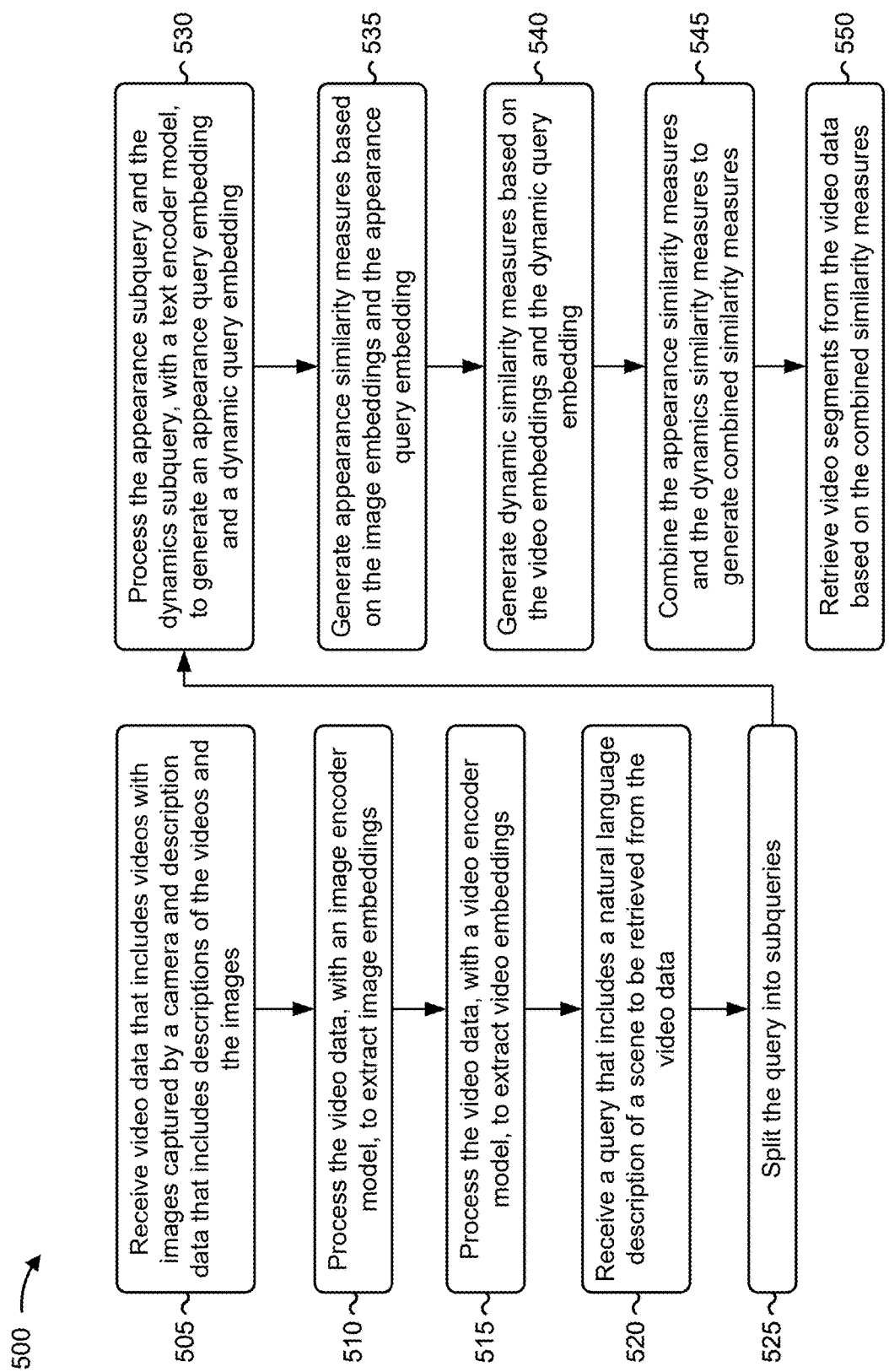
FIG. 5 is a flowchart of an example process for retrieving relevant video footage based on a natural language query.

FIG. 5 depicts a flowchart of an example process 500 for retrieving relevant video footage based on a natural language query. In some implementations, one or more process blocks of FIG. 5 may be performed by a device (e.g., the video system 110). In some implementations, one or more process blocks of FIG. 5 may be performed by another device or a group of devices separate from or including the device, such as a control system of the vehicle, a camera (e.g., the camera 105), and/or the like. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving video data that includes videos with images captured by a camera and description data that includes descriptions of the videos and the images (block 505). For example, the device may receive video data that includes videos with images captured by a camera and description data that includes descriptions of the videos and the images, as described above.

As further shown in FIG. 5, process 500 may include processing the video data, with an image encoder model, to extract image embeddings (block 510). For example, the device may process the video data, with an image encoder model, to extract image embeddings, as described above.

As further shown in FIG. 5, process 500 may include processing the video data, with a video encoder model, to extract video embeddings (block 515). For example, the device may process the video data, with a video encoder model, to extract video embeddings, as described above.

As further shown in FIG. 5, process 500 may include receiving a query that includes a natural language description of a scene to be retrieved from the video data (block 520). For example, the device may receive a query that includes a natural language description of a scene to be retrieved from the video data, as described above.

As further shown in FIG. 5, process 500 may include splitting the query into subqueries (block 525). For example, the device may split the query into an appearance subquery and a dynamics subquery, as described above. In some implementations, splitting the query into the appearance subquery and the dynamics subquery includes processing the query, with a language model, to generate the appearance subquery and the dynamics subquery from the query. In some implementations, the appearance subquery relates to an appearance of the scene and the dynamics subquery relates to a global evolution of objects in the scene.

As further shown in FIG. 5, process 500 may include processing the appearance subquery and the dynamics subquery, with a text encoder model, to generate an appearance query embedding and a dynamic query embedding (block 530). For example, the device may process the appearance subquery and the dynamics subquery, with a text encoder model, to generate an appearance query embedding and a dynamic query embedding, as described above.

As further shown in FIG. 5, process 500 may include generating appearance similarity measures based on the image embeddings and the appearance query embedding (block 535). For example, the device may generate appearance similarity measures based on the image embeddings and the appearance query embedding, as described above. In some implementations, generating the appearance similarity measures based on the image embeddings and the appearance query embedding includes calculating pairwise distances between the appearance query embedding and the image embeddings, and determining the appearance similarity measures based on the pairwise distances.

As further shown in FIG. 5, process 500 may include generating dynamic similarity measures based on the video embeddings and the dynamic query embedding (block 540). For example, the device may generate dynamic similarity measures based on the video embeddings and the dynamic query embedding, as described above. In some implementations, generating the dynamic similarity measures based on the video embeddings and the dynamic query embedding includes calculating pairwise distances between the dynamics query embedding and the video embeddings, and determining the dynamic similarity measures based on the pairwise distances.

As further shown in FIG. 5, process 500 may include combining the appearance similarity measures and the dynamics similarity measures to generate combined similarity measures (block 545). For example, the device may combine the appearance similarity measures and the dynamics similarity measures to generate combined similarity measures, as described above. In some implementations, combining the appearance similarity measures and the dynamics similarity measures to generate the combined similarity measures includes computing a weighted average of the appearance similarity measures and the dynamics similarity measures, and utilizing the weighted average to generate the combined similarity measures.

As further shown in FIG. 5, process 500 may include retrieving video segments from the video data based on the combined similarity measures (block 550). For example, the device may retrieve video segments from the video data based on the combined similarity measures, as described above.

In some implementations, process 500 includes receiving metadata associated with the video data, processing the metadata to generate metadata similarity measures, and including the metadata similarity measures in the combined similarity measures prior to retrieving the video segments from the video data. In some implementations, the metadata includes geospatial information associated with the video data and tags indicating semantic content of the video data. In some implementations, process 500 includes storing the image embeddings and the video embeddings in a data structure and prior to receiving the query.

In some implementations, process 500 includes providing the video segments for display to a user of the device. In some implementations, process 500 includes training the image encoder model, the video encoder model, and the text encoder model with historical video data that includes historical videos with historical images captured by cameras and historical description data that includes historical descriptions of the historical videos and the historical images. In some implementations, process 500 includes utilizing geospatial metadata associated with the video data when retrieving the video segments from the video data. In some implementations, process 500 includes incorporating semantic indexing and metadata-based indexing when retrieving the video segments from the video data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, video data that includes videos with images captured by a camera and description data that includes descriptions of the videos and the images;
   processing, by the device, the video data, with an image encoder model, to extract image embeddings;
   processing, by the device, the video data, with a video encoder model, to extract video embeddings;
   receiving, by the device, a query that includes a natural language description of a scene to be retrieved from the video data;
   splitting, by the device, the query into an appearance subquery and a dynamics subquery;
   processing, by the device, the appearance subquery and the dynamics subquery, with a text encoder model, to generate an appearance query embedding and a dynamic query embedding;
   generating, by the device, appearance similarity measures based on the image embeddings and the appearance query embedding;
   generating, by the device, dynamic similarity measures based on the video embeddings and the dynamic query embedding;
   combining, by the device, the appearance similarity measures and the dynamics similarity measures to generate combined similarity measures; and
   retrieving, by the device, video segments from the video data based on the combined similarity measures.

2. The method of claim 1, wherein combining the appearance similarity measures and the dynamics similarity measures to generate the combined similarity measures comprises:
   computing a weighted average of the appearance similarity measures and the dynamics similarity measures; and
   utilizing the weighted average to generate the combined similarity measures.

3. The method of claim 1, further comprising:
   receiving metadata associated with the video data;
   processing the metadata to generate metadata similarity measures; and including the metadata similarity measures in the combined similarity measures prior to retrieving the video segments from the video data.

4. The method of claim 3, wherein the metadata includes geospatial information associated with the video data and tags indicating semantic content of the video data.

5. The method of claim 1, further comprising:
storing the image embeddings and the video embeddings in a data structure and prior to receiving the query.

6. The method of claim 1, wherein generating the appearance similarity measures based on the image embeddings and the appearance query embedding comprises:
calculating pairwise distances between the appearance query embedding and the image embeddings; and
determining the appearance similarity measures based on the pairwise distances.

7. The method of claim 1, wherein generating the dynamic similarity measures based on the video embeddings and the dynamic query embedding comprises:
calculating pairwise distances between the dynamics query embedding and the video embeddings; and
determining the dynamic similarity measures based on the pairwise distances.

8. A device, comprising:
one or more processors configured to:
receive video data that includes videos with images captured by a camera and description data that includes descriptions of the videos and the images;
process the video data, with an image encoder model, to extract image embeddings;
process the video data, with a video encoder model, to extract video embeddings;
receive a query that includes a natural language description of a scene to be retrieved from the video data;
split the query into an appearance subquery and a dynamics subquery;
process the appearance subquery and the dynamics subquery, with a text encoder model, to generate an appearance query embedding and a dynamic query embedding;
generate appearance similarity measures based on the image embeddings and the appearance query embedding;
generate dynamic similarity measures based on the video embeddings and the dynamic query embedding;
compute a weighted average of the appearance similarity measures and the dynamics similarity measures;
utilizing the weighted average to generate combined similarity measures; and
retrieve video segments from the video data based on the combined similarity measures.

9. The device of claim 8, wherein the one or more processors are further configured to:
provide the video segments for display to a user of the device.

10. The device of claim 8, wherein the one or more processors, to split the query into the appearance subquery and the dynamics subquery, are configured to:
process the query, with a language model, to generate the appearance subquery and the dynamics subquery from the query.

11. The device of claim 8, wherein the one or more processors are further configured to:
train the image encoder model, the video encoder model, and the text encoder model with historical video data that includes historical videos with historical images captured by cameras and historical description data that includes historical descriptions of the historical videos and the historical images.

12. The device of claim 8, wherein the one or more processors are further configured to:
utilize geospatial metadata associated with the video data when retrieving the video segments from the video data.

13. The device of claim 8, wherein the one or more processors are further configured to:
incorporate semantic indexing and metadata-based indexing when retrieving the video segments from the video data.

14. The device of claim 8, wherein the appearance subquery relates to an appearance of the scene and the dynamics subquery relates to a global evolution of objects in the scene.

15. A non-transitory computer-readable medium storing a set of instructions, the set of instructions comprising:
one or more instructions that, when executed by one or more processors of a device, cause the device to:
receive video data that includes videos with images captured by a camera and description data that includes descriptions of the videos and the images;
process the video data, with an image encoder model, to extract image embeddings;
process the video data, with a video encoder model, to extract video embeddings;
receive a query that includes a natural language description of a scene to be retrieved from the video data;
split the query into an appearance subquery and a dynamics subquery;
process the appearance subquery and the dynamics subquery, with a text encoder model, to generate an appearance query embedding and a dynamic query embedding;
generate appearance similarity measures based on the image embeddings and the appearance query embedding;
generate dynamic similarity measures based on the video embeddings and the dynamic query embedding;
combine the appearance similarity measures and the dynamics similarity measures to generate combined similarity measures;
retrieve video segments from the video data based on the combined similarity measures; and
provide the video segments for display to a user of the device.

16. The non-transitory computer-readable medium of claim 15, wherein the one or more instructions further cause the device to:
receive metadata that includes geospatial information associated with the video data and tags indicating semantic content of the video data;
process the metadata to generate metadata similarity measures; and
include the metadata similarity measures in the combined similarity measures prior to retrieving the video segments from the video data.

17. The non-transitory computer-readable medium of claim 15, wherein the one or more instructions, that cause the device to generate the appearance similarity measures based on the image embeddings and the appearance query embedding, cause the device to:
  calculate pairwise distances between the appearance query embedding and the image embeddings; and
  determine the appearance similarity measures based on the pairwise distances.

18. The non-transitory computer-readable medium of claim 15, wherein the one or more instructions, that cause the device to generate the dynamic similarity measures based on the video embeddings and the dynamic query embedding, cause the device to:
  calculate pairwise distances between the dynamics query embedding and the video embeddings; and
  determine the dynamic similarity measures based on the pairwise distances.

19. The non-transitory computer-readable medium of claim 15, wherein the one or more instructions, that cause the device to split the query into the appearance subquery and the dynamics subquery, cause the device to:
  process the query, with a language model, to generate the appearance subquery and the dynamics subquery from the query.

20. The non-transitory computer-readable medium of claim 15, wherein the one or more instructions further cause the device to:
  train the image encoder model, the video encoder model, and the text encoder model with historical video data that includes historical videos with historical images captured by cameras and historical description data that includes historical descriptions of the historical videos and the historical images.

\* \* \* \* \*